May 10, 1966 S. GREENBERG 3,250,272
MOUTHPIECE
Filed Nov. 5, 1963
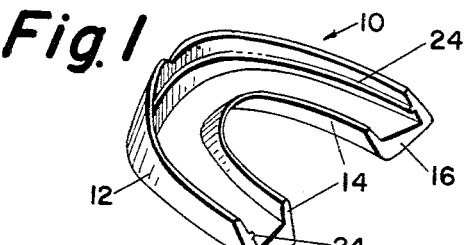
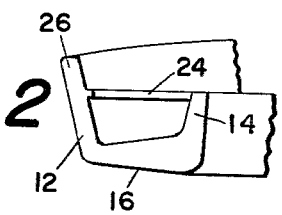
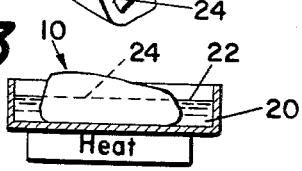
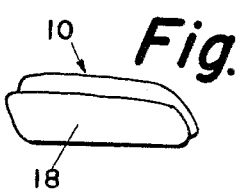
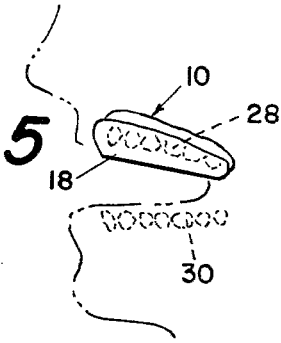
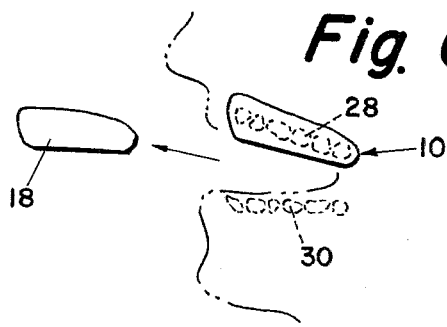
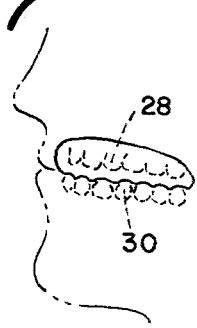
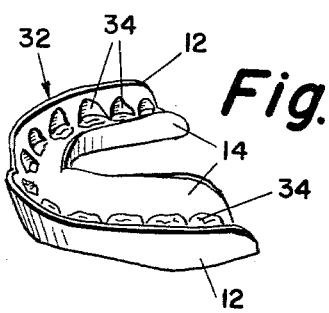
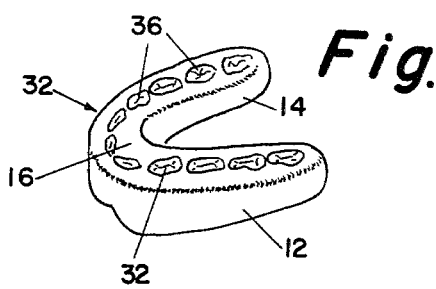
INVENTOR.
SAMUEL GREENBERG
BY
Millman and Jacobs
ATTORNEYS : 3,250,272
MOUTHPIECE
Samuel Greenberg, 1930 Chestnut St., Philadelphia, Pa.
Filed Nov. 5, 1963, Ser. No. 321,560
3 Claims. (Cl. 128—136)

This application is a continuation-in-part of my copending application Serial Number 268,526 filed March 25, 1963, now abandoned.

This invention relates to a guard to protect the teeth, mouth and lips of athletic contestants.

Heretofore a number of different types of mouthpieces have appeared in the prior art, some made of rubber with a more or less rigid palatal piece, some made of a rubber base with a pliable resin filler or strip secured by adhesion therein, some made of a resilient base with a thermo-setting fusible resin therein and others made entirely of a thermo-setting fusible resin. Those made entirely of rubber or thermo-setting fusible resin require the lengthy procedure of first taking an impression of the mouth, then making a model of artificial stone, thereafter molding the plastic material thereon, trimming the guard and reapplying to the mouth for final adjustment and fitting. Those made with a resin filler or strip may be molded directly in the mouth but have the disadvantage in that the base and resin filler or strip may become separated and generally require considerable time in the mouth for complete setting.

The primary object of the invention is to provide a mouthpiece which overcomes the disadvantages noted above in that it is readily and rapidly made by a procedure which eliminates the need for first taking an impression of the mouth, then making a model and thereafter molding to the model and refitting and also eliminates the separate resin filler or strip.

Another object of the invention is to provide a mouthpiece made of a plastic which is pre-molded by a relatively simple technique to form a standard substantially U-shaped saddle which is then rapidly softened and inserted in the mouth over the upper teeth where it takes the impression of the teeth and at the same time rapidly hardens to produce the final mouthpiece without more.

Another object of the invention is to provide a mouthpiece of the character described in which the resin from which it is made is characterized by having a melting range of 185° F.–230° F., has no volatile plasticizers, retains its essential shape and is tough at body and room temperatures but is capable of being softened sufficiently or rendered formable to take accurate impressions under pressure at temperatures down to 130° F., which impressions become fixed below this temperature. Thus, the instant mouthpiece may be rapidly and accurately molded in the mouth at comfortable temperatures.

Another object of the invention is to provide a mouthpiece of a resilient thermo-plastic resin which, by the use of a standard substantially U-shaped saddle of the resin permits the taking of the impression of the upper teeth on the inside thereof and the lower teeth on the outside in the same application and, directly molding the same in the mouth with exceptional rapidity.

Yet another object of the invention is to provide a substantially U-shaped mouthpiece wherein the thickness of the web joining the inner and outer flanges tapers towards the outer flange to allow for formation of the outer indentations of the lower teeth at the thicker portion and thereby maintain the cushioning strength of the guard. The instant mouthpiece reduces the chance of damage at the point of impact because it not only cushions against direct blows but also displaces them equally over the entire arch.

These and other objects of the invention will become more apparent as the following description proceeds in conjunction with the accompanying drawings, wherein:

FIG. 1 is a perspective view of the standard saddle employed in the formation of the instant mouthpiece;

FIG. 2 is an end elevational view thereof;

FIG. 3 is a diagrammatic view illustrating the heating of the saddle to soften it;

FIG. 4 is a side elevational view of the softened saddle positioned in a tray;

FIG. 5 is a side elevational view showing the insertion of the tray and saddle in the mouth over the upper teeth;

FIG. 6 is a view similar to FIG. 5 with the tray removed;

FIG. 7 is a view similar to FIG. 6 showings the molding of the upper and lower teeth indentations in the saddle in the bite position;

FIG. 8 is a perspective view of the mouthpiece looking at the interior thereof; and FIG. 9 is a view similar to FIG. 8 looking at the exterior of the mouthpiece.

Specific reference is now made to the drawings wherein similar reference characters are used for corresponding elements throughout.

The saddle and eventual even mouthpiece of the instant invention is made by a procedure to be described hereafter from a thermoplastic resin characterized by the fact that it is resilient at temperatures up to the range of 185° F.–230° F., but which softens sufficiently to take an impression under bite pressure at temperatures down to about 130° F. without losing its essential shape. When the resin is then cooled below 130° F., the impressions remain fixed.

Two classes of thermoplastic resins have been found to possess these characteristics. One is vinyl acetate-ethylene copolymer having a melting range of 185° F.–230° F., no volatile plasticizers, 20–35% by weight of vinyl acetate, the remainder being ethylene. Such a material is available commercially from Luxene, Inc. of New York, New York as Luxene VF 63. The other class of thermoplastic resins is ethyl acrylate-ethylene copolymer, having a melting range of 185° F.–230° F., no volatile plasticizers, 20–35% by weight of ethyl acrylate, the remainder being ethylene. Such material is available commercially from Union Carbide and Carbon Co. of Moorestown, N.J. as DQDA 3270. The foregoing resins have the additional desirable properties of being odorless, tasteless and non-toxic.

The saddle is indicated at 10 and as seen in FIG. 2 is a substantially U-shaped member of channel crossed-section comprising an outer flange 12 and a lower inner or lingual flange 14 connected by a web portion 16 which tapers in thickness downwardly towards the outer flange. The entire web is thicker than the flange is. Its outer surface tapers upwardly at its distal ends while the posterior ends of the inner and outer flanges taper anteriorally. The saddle is readily and easily made by conventional injection molding techniques or, if desired, by a casting technique wherein the sheet of the plastic is softened by placing it in boiling water for about a minute, inserting it in a female metal mold of shape and cross section conforming to that described above, closing and pressing a male mold therein and removing the saddle after about one minute as the mold cools.

A conventional channel horseshoe-shaped tray 18 is prepared by insertion into the mouth over the upper teeth and adjusted by bending or spreading, if necessary. The tray may be made of a suitable metal, such as aluminum, or may be injection molded or otherwise made from plastics such as polyethylene, polypropylene, or polystyrene. The saddle is placed in a shallow pan of water 20. The water is brought to a full boil and kept at a slow boil for about 75 seconds, the level 22 of the water preferably covering the line 24 inscribed on the inside of the outer flange 12 defining a horizontal plane just at or slightly above the upper edge of the inner flange 14 so that the saddle can be lifted from the water by the portion 26 of the outer flange 12 above the line 24. This also insures application of a greater amount of heat in the thicker area of the web. By subjecting the saddle to the temperature of boiling water for this short period of 75 seconds, the saddle attains a temperature of about 160° F., softens and becomes impressionable without losing its original horseshoe channel form. The saddle may be softened by keeping it in water at a lower temperature for a longer period of time, but this is not necessary or particularly desirable.

The saddle is then removed from the water, placed in and adapted to the tray 18, inserted at a temperature of about 130–135° F. into the mouth (which was previously rinsed with cold water) over the upper teeth 28 and under the upper lip and pushed upwardly and backwardly with strong pressure. This procedure is accomplished in about 5 seconds so that the saddle can still retain its essential form and take the impression at said elevated softening temperature. After the tray and saddle are thus kept in the mouth for about 10 seconds with constant application of pressure, the tray is removed, the saddle remaining in place over the upper teeth, as seen in FIG. 6. The patient then bites firmly into the saddle with the lower teeth 30 for about 30 seconds while pressure is applied and maintained against the teeth going from front, to sides, to back.

The saddle is then removed and cooled below 130° F. to fix the teeth impressions therein. Most desirably, it is rinsed in cold water for about 15 seconds to cause the impressions to fix rapidly. The saddle is then reinserted in the mouth to check for retention and for over extended and thick areas which can be cut away with a sharp scissors or warm knife. At mouth temperature, e.g. 98–99° F., the mouthpiece is tough and resilient and the teeth impressions retain their molded-in fixed positions. In its final preferred form, the guard 32 has indentations 34 on the inside thereof in the outer flange 12 and the web 16 formed as impressions of the front and lower surfaces of the upper teeth respectively and indentations 36 on the outside thereof in the thicker portion of the web 16 as impressions of the biting surfaces of the lower teeth. In use the mouthpiece acts effectively to cushion against direct blows, and because the inner and outer indentations act to locate the bite of the teeth, the blows are displaced equally over the entire arch of the mouth.

While a preferred embodiment has here been shown and described, it will be understood that skilled artisans may make minor variations without departing from the spirit of the invention and the scope of the appended claims. Thus, where a person has a prominent jaw, the softened saddle is placed over the lower teeth and there molded with the indentations 36 on the outside thereof constituting the impressions of the biting surfaces of the upper teeth. Furthermore, where one desires a mouthpiece without exterior teeth impressions, the saddle is placed in the tray and inserted in the mouth at about 130–135° F. over the teeth and the patient bites into the tray with the posterior teeth for about 30 seconds, after which the tray and saddle are removed and cooled. Also, although easier to manipulate with a tray, the teeth impressions can be made in the saddle without the use of the tray.

I claim:
1. A saddle for use in making a mouthpiece comprising a substantially U-shaped member of channel cross-section made of a thermoplastic resin which is fixed in form and resilient up to the temperature range of 185° F.–230° F. but sufficiently soft to take tooth impressions under pressure below said range down to about 130° F. without losing its essential shape and fix them below said temperature, said resin being selected from the class consisting of vinyl acetate-ethylene copolymer having 20–35% by weight of vinyl acetate, remainder ethylene and ethyl acrylate-ethylene copolymer having 20–35% by weight of ethyl acrylate, remainder ethylene, said member having inner and outer flanges joined by a web which tapers in thickness downwardly from said inner to said outer flange, so that impressions of one set of teeth may be made on the inside of said channel and impressions of the bite surface of the opposite set of teeth may be made in the outer surface of the web without sacrificing thickness of the web as required for proper protection.

2. A saddle for use in making a mouthpiece comprising a substantially U-shaped member of channel cross-section made of a thermoplastic resin which is fixed in form and resilient up to the temperature range of 185° F.–230° F. but sufficiently soft to take tooth impressions under pressure below said range down to about 130° F. without losing its essential shape and fix them below said temperature, said resin being selected from the class consisting of vinyl acetate-ethylene copolymer having 20–35% by weight of vinyl acetate, remainder ethylene and ethyl acrylate-ethylene copolymer having 20–35% by weight of ethyl acrylate, remainder ethylene, said member having inner and outer flanges joined by a web which tapers in thickness downwardly from said inner to said outer flange and is thicker than said flanges, so that impressions of one set of teeth may be made on the inside of said channel and impressions of the bite surface of the opposite set of teeth may be made in the outer surface of the web without sacrificing thickness of the web as required for proper protection.

3. A saddle for use in making a mouthpiece comprising a substantially U-shaped member of channel cross-section made of a thermoplastic resin which is fixed in form and resilient up to the temperature range of 185° F.–230° F. but sufficiently soft to take tooth impressions under pressure below said range down to about 130° F. without losing its essential shape and fix them below said temperature, said resin being selected from the class consisting of vinyl acetate-ethylene copolymer having 20–35% by weight of vinyl acetate, remainder ethylene and ethyl acrylate-ethylene copolymer having 20–35% by weight of ethyl acrylate, remainder ethylene, said member having inner and outer flanges joined by a web which tapers in thickness downwardly from said inner to said outer flange, is thicker than said flanges and tapers upwardly at its distal ends, so that impressions of one set of teeth may be made on the inside of said channel and impressions of the bite surface of the opposite set of teeth may be made in the outer surface of the web without sacrificing thickness of the web as required for proper protection.

References Cited by the Examiner
UNITED STATES PATENTS

| 2,630,117 | 3/1953 | Coleman | 128—136 |
| 2,706,478 | 4/1955 | Porter | 128—136 |
| 3,096,761 | 7/1963 | Moffett | 128—136 |
| 3,112,744 | 12/1963 | Grossberg | 128—136 |
| 3,124,129 | 3/1964 | Grossberg | 128—136 |

RICHARD A. GAUDET, *Primary Examiner.*